United States Patent [19]

Wilhelmi et al.

[11] Patent Number: 5,602,425
[45] Date of Patent: Feb. 11, 1997

[54] MOTOR VEHICLE SEAT-OCCUPANCY-DETECTION DEVICE

[75] Inventors: Volker Wilhelmi, Esslingen; Ernst Maier, Stuttgart, both of Germany

[73] Assignee: Mercedes-Benz AG, Germany

[21] Appl. No.: 343,889

[22] Filed: Nov. 16, 1994

[30] Foreign Application Priority Data

Nov. 16, 1993 [DE] Germany .......................... 43 39 113.3

[51] Int. Cl.⁶ .................................................. B60K 28/04
[52] U.S. Cl. ......................... 307/10.1; 307/9.1; 180/271; 280/722
[58] Field of Search ....................... 307/9.1–10.8, 307/38, 39, 119; 280/722, 730, 728, 732, 735; 180/271, 272, 273; 364/424.05, 424.01

[56] References Cited

U.S. PATENT DOCUMENTS

| 4,754,255 | 6/1988 | Sanders | 180/287 |
|---|---|---|---|
| 4,797,824 | 1/1989 | Sugiyama | 364/424.05 |
| 4,833,614 | 5/1989 | Saitoh et al. | 364/424.05 |
| 4,852,934 | 8/1989 | Yasuda et al. | 340/425.5 |
| 5,006,771 | 4/1991 | Ogasawara | 307/10.1 |
| 5,232,243 | 8/1993 | Blackburn et al. | 280/732 |
| 5,323,872 | 6/1994 | Yabe | 180/271 |
| 5,361,865 | 11/1994 | Lindner | 180/273 |
| 5,394,955 | 3/1995 | Howard | 180/273 |
| 5,404,300 | 4/1995 | Sugiura | 307/38 |

FOREIGN PATENT DOCUMENTS

| 3843624A1 | 7/1989 | Germany . |
|---|---|---|
| 4212018A1 | 10/1992 | Germany . |
| 2212629 | 7/1989 | United Kingdom . |

*Primary Examiner*—William M. Shoop, Jr.
*Assistant Examiner*—Peter Ganjoo
*Attorney, Agent, or Firm*—Evenson, McKeown, Edwards & Lenahan P.L.L.C.

[57] ABSTRACT

The invention provides a seat-occupancy-detection device in a motor vehicle, by means of which seat functions can be actuated dependent on the load acting on the seat, which device is configured such that it can be utilized and implemented in a more versatile manner. By using a data bus in the vehicle, which provides the functions connected to the data bus with items of information throughout the vehicle, the area around a seating position is automatically adapted based on seat occupancy.

14 Claims, 1 Drawing Sheet

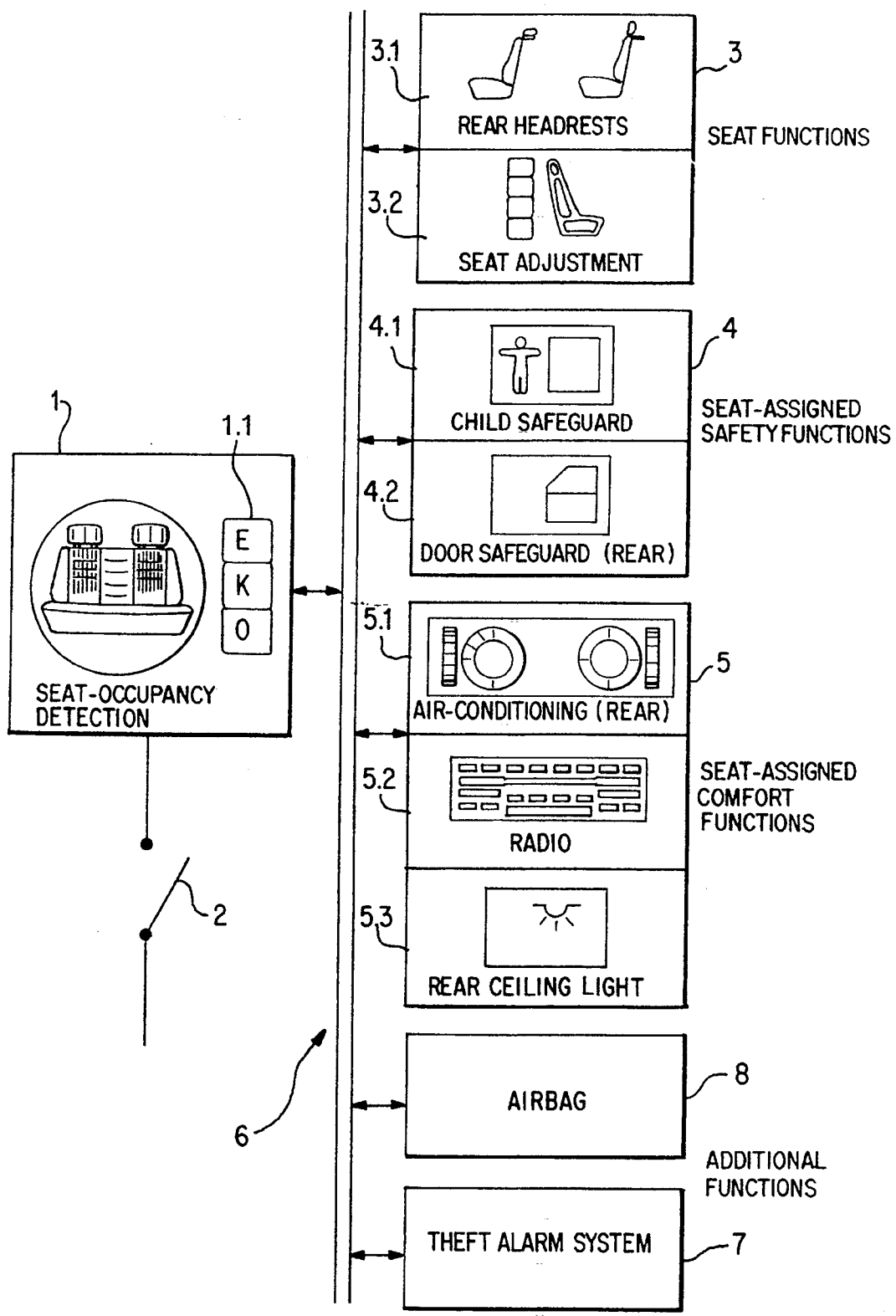

MOTOR VEHICLE SEAT-OCCUPANCY-DETECTION DEVICE

BACKGROUND AND SUMMARY OF THE INVENTION

The invention relates to a device for detecting seat occupancy in a motor vehicle.

German patent document DE 38 43 624 A1 discloses a seat-occupancy-detection device in a vehicle, which has a weight sensor fitted near the base surface of a seat cushion of a seat, and distinguishes between child and adult or non-occupancy, based on pressure exerted on the seat. When the seat-occupancy-detection device senses that the seat is occupied by a passenger, it is possible to activate a drive device to move a headrest which is fitted on the seat, out of a rest position into an operating position.

Another seat-occupancy-detection device, for detecting an occupant in the rear seal of a motor vehicle, is disclosed in U.S. Pat. No. 4,852,934. In this arrangement, when occupancy of the rear seat is detected, rearward movement of the corresponding electrically adjustable front seat is restricted, so that obstruction of the person on the rear seat is prevented.

Still another motor vehicle seat-occupancy-detection device is disclosed in German patent document DE 42 12 018 A1 wherein, when occupancy of the seat is detected, the seat-assigned occupant-retaining system (airbag) is triggered in the event of danger. Moreover, the weight and the position of the occupant who is occupying the seat is taken into account in order to determine the extent airbag inflation.

The object of the present invention is to provide a seat-occupancy-detection device which can be utilized and implemented in a still more versatile manner.

This object is achieved according to the invention, in which in addition to the known functions (for example, of actuability of a headrest as described above), certain seat-assigned safety and comfort functions are automatically actuated based on the load acting on the seat. The area around a seating position is thus automatically adapted based on the seat occupancy, which may assume the values "0" for "not occupied", "K" for "occupied by a child" and "E" for "occupied by an adult", as described hereinbelow for the rear of a vehicle. This feature is made possible by the use of a data bus in the vehicle, which provides the functions connected to the data bus with items of information throughout the vehicle.

Other objects, advantages and novel features of the present invention will become apparent from the following detailed description of the invention when considered in conjunction with the accompanying drawings.

BRIEF DESCRIPTION OF THE DRAWING

The single figure of the drawing shows an exemplary embodiment of the invention, which is represented schematically.

DETAILED DESCRIPTION OF THE DRAWING

A control unit assigned to control the functioning of the seat-occupancy-detection device installed in the rear seat may be activated or deactivated via a switch 2. When the switch 2 is open, the seat-occupancy-detection device is inactive; when the switch 2 is closed, it is active.

The control unit 1 of the seat-occupancy-detection device communicates via a data bus 6 with the control units 3, 4, 5 of the connected functions 3.1, 3.2, 4.1, 4.2, 5.1, 5.2, 5.3. In particular, the following are represented: the control unit 3 for controlling the headrest function 3.1 and seat-adjustment-locking function 3.2, the control unit 4 for controlling the child safeguard function 4.1 of the rear window and the child safeguard function 4.2 of the rear doors, the control unit 5 for controlling the rear air-conditioning function 5.1, the radio function 5.2 and the rear-ceiling-light function 5.3. The term "seat functions" covers the headrest function 3.1 and seat-adjustment-locking function 3.2, while the term "seat-assigned safety functions" covers the child safeguard function 4.1 of the rear doors and the child safeguard function 4.2 of the rear windows, and the term "seat-assigned comfort functions" covers the rear air-conditioning function 5.1, the radio function 5.2 and the rear-ceiling-light function 5.3.

If the seat occupancy of at least one of the rear seats assumes the value of "0", the headrest function 3.1 for the headrest of that seat, if it is in an operating position, is automatically activated to move into a rest position; however, if it is already in a rest position, the headrest remains in this position.

Furthermore, the rear air-conditioning control 5.1 assigned to that seat in the rear whose seat occupancy has assumed the value of "0" is activated to throttle or switch off the rear air-conditioning assigned to that seat.

If the seat occupancy of all the seats in the rear have the value of "0", the seat-assigned safety function (the child safeguard function 4.1 of the rear doors and the child safeguard function 4.2 of the rear windows, the seat-adjustment-locking function 3.2, the radio function 5.2 and the rear-ceiling-light function 5.3) are inactive.

Moreover, if the seat occupancy of at least one seal in the rear assumes the value of "K", the following functions are activated:

The headrest control 3.1 for the headrest of that seat is automatically activated so that the headrest (if it is in an operating position) is automatically moved into a rest position; however, if it is already in a rest position, the headrest remains in this position.

The child safeguard function 4.1 of the rear doors is automatically activated, so that the two rear doors are locked and, in particular cannot be opened from the inside.

The child safeguard function 4.2 of the rear windows is automatically activated for at least that rear window which is located in the immediate vicinity of the rear seat whose seat occupancy has the value "K", so that the corresponding rear window is locked with respect to actuation from the rear.

The seat-adjustment-locking function 3.2 is automatically activated for this rear seat at least, so that adjustment of the seat from the rear is disabled.

The radio function 5.2 is automatically activated, so that the volume and balance control of the car radio (provided that it is switched on) are automatically adapted to the fact that at least one seat in the rear is occupied.

The rear air-conditioning control 5.1 is inactive.

Furthermore, if the seat occupancy of at least one seat in the rear has the value "K" and none of the seats in the rear has the seat occupancy value "E", the rear-ceiling-light function 5.3 is automatically activated, so that operation of the rear ceiling lights from the rear is automatically disabled.

If the seat occupancy of at least one seat in the rear assumes the value "E" the following functions are activated:

The headrest control 3.1 for the headrest of that seat is automatically activated so that the headrest (if it is in a rest position) is automatically moved into an operating position; however, if it is already in an operating position, the headrest remains in this position.

The radio function 5.2 is automatically activated, so that the volume and balance control of the car radio (provided that it is switched on) is automatically adapted to the fact that at least one seat in the rear is occupied.

The seat-assigned safety functions (that is, the child safeguard function 4.1 of the rear doors and the child safeguard function 4.2 of the rear windows, the seat-adjustment-locking function 3.2 and the rear air-conditioning function 5.1) are inactive.

Furthermore, if the seat occupancy of at least one seat in the rear has the value "K" and locking of the vehicle is combined with arming of a theft alarm system 7 (with passenger-compartment monitoring), the theft alarm system can be deactivated as an additional function, in order to prevent unintentional triggering of an alarm.

If, moreover, airbags 8 assigned to the rear seats should be arranged in the vehicle, then the airbag assigned to the occupied seat (value "K" and "E") is likewise activated as an additional function. That is to say, in the event of danger, the rear airbag is triggered only if the seat is occupied.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for controlling safety, comfort and seat functions with respect to seats of a vehicle, comprising:
   a plurality of sensors for detecting occupancy and loading of a vehicle seat, a separate such sensor being assigned to each of a plurality of respective seats of said vehicle;
   first means for actuating seat functions for at least one vehicle seat in response to detected loading of said vehicle seat;
   second means for actuating safety functions for said at least one vehicle seat in response to detected loading of such vehicle seat; and
   third means for actuating comfort functions for said at least one vehicle seat in response to detected occupancy or nonoccupancy of said vehicle seat.

2. Arrangement according to claim 1 wherein said first, second and third means automatically actuate said safety and comfort functions.

3. Arrangement according to claim 2 wherein automatic actuation is controlled in response to position of a switch which can be operated at will.

4. Arrangement according to claim 1 wherein additional functions can be actuated in dependance on the seat loading and additional functions can be actuated in dependence on occupancy or nonoccupancy.

5. Arrangement according to claim 1 wherein said sensors detect loading of said vehicle seat according to conditions of unoccupied, occupied by an adult, and occupied by a child.

6. Arrangement according to claim 5 wherein if at least one rear seat of said vehicle is detected as occupied by a child, a head rest control for a head rest of seats detected as occupied by children are automatically into a rest position, a child safeguard function of rear vehicle doors is automatically activated to prevent unlocking from inside the vehicle, a child safeguard function of the rear windows is automatically activated whereby at least a rear window located in an immediate vicinity of any seat detected to be occupied by a child is locked in position, a seat adjustment locking function is automatically activated for a rear seat detected to be occupied by a child, a radio function is automatically adjusted, and a rear air conditioning control is deactivated.

7. Arrangement according to claim 6 wherein if no rear seat of said vehicle is detected to be occupied by an adult, a rear ceiling light function is automatically disabled.

8. Arrangement according to claim 5 wherein if at least one rear seat of said vehicle is detected to be occupied by an adult, a head rest for seats occupied by an adult is moved into an operating position, a radio function is automatically adjusted for occupancy of said seat, and child safeguard functions for rear windows and doors, a seat adjustment locking function, and a rear air conditioning function are deactivated.

9. Arrangement according to claim 5 wherein if all rear seats of said vehicle are detected as unoccupied, child safeguard functions of rear doors and rear windows, a seat adjustment locking function, a radio function and a lighting function of said vehicle are deactivated.

10. Arrangement according to claim 5 wherein if a rear seat of said vehicle is detected as unoccupied, a headrest of said rear seat is moved to a rest position and air conditioning for said rear seat is reduced.

11. Arrangement according to claim 5 wherein a vehicle air bag restraint system is activated for all seats of said vehicle which are detected to be occupied by a child or by an adult.

12. Arrangement according to claim 2 wherein said safety functions include at least one of: child safeguard function of rear windows, child safeguard function of rear doors, a seat adjustment locking function, and enablement of air bag deployment.

13. Arrangement according to claim 12 wherein said comfort functions include at least one of: air conditioning, radio and interior lighting.

14. Arrangement according to claim 1 wherein said comfort functions include at least one of: air conditioning, radio and interior lighting.

* * * * *